US009976777B2

(12) United States Patent
Peng et al.

(10) Patent No.: US 9,976,777 B2
(45) Date of Patent: May 22, 2018

(54) SOLAR THERMAL COLLECTING SYSTEM

(71) Applicant: Hsiu-Lin Peng, Tainan (TW)

(72) Inventors: Hsiu-Lin Peng, Kaohsiung (TW);
Yu-Yao Chen, Tainan (TW)

(73) Assignee: Hsiu-Lin Peng, Tainan (TW)

( * ) Notice: Subject to any disclaimer, the term of this patent is extended or adjusted under 35 U.S.C. 154(b) by 961 days.

(21) Appl. No.: 14/451,443

(22) Filed: Aug. 5, 2014

(65) Prior Publication Data
US 2016/0040908 A1   Feb. 11, 2016

(51) Int. Cl.
*F24J 2/30* (2006.01)
*F24J 2/24* (2006.01)
*F24J 2/10* (2006.01)
*F24J 2/32* (2006.01)
*F24J 2/40* (2006.01)
(Continued)

(52) U.S. Cl.
CPC ............ *F24J 2/30* (2013.01); *F24J 2/1047* (2013.01); *F24J 2/245* (2013.01); *F24J 2/32* (2013.01); *F24J 2/40* (2013.01); *F24J 2/463* (2013.01); *F24J 2/4647* (2013.01); *F24J 2/485* (2013.01); *F24J 2/507* (2013.01); *F24J 2/05* (2013.01); *Y02E 10/44* (2013.01)

(58) Field of Classification Search
CPC ..................... F24J 2/05; F24J 2/30; F24J 2/24
USPC ................. 126/643, 694, 576, 572, 660
See application file for complete search history.

(56) References Cited

U.S. PATENT DOCUMENTS 4,207,744 A * 6/1980 Takeshita ............... F24J 2/0477
126/651
4,220,136 A * 9/1980 Penney .................. F24J 2/0015
126/600

(Continued)

FOREIGN PATENT DOCUMENTS

CN          2349512        11/1999
CN        101603737        12/2009
(Continued)

OTHER PUBLICATIONS

"Office Action of China Counterpart Application", dated Jan. 21, 2016, p. 1-p. 6, in which the listed references ere cited.
(Continued)

*Primary Examiner* — Gregory Huson
*Assistant Examiner* — Nikhil Mashruwala
(74) *Attorney, Agent, or Firm* — JCIPRNET

(57) ABSTRACT

A solar thermal collecting system, including at least one solar thermal collector and a pressure-adjusting module, is provided. The solar thermal collector includes a container, a light-transmissive cover that seals the container, and a plurality of solar thermal collecting pipes. The solar thermal collecting pipes are installed in the container, so as to allow a heat transfer material to flow therein. The outer surfaces of the solar thermal collecting pipes are correspondingly deposited with solar selective coatings for absorbing solar radiation energy, transforming the radiation energy into thermal energy, and transmitting thermal energy to the heat transfer material flowing in the solar thermal collecting pipes. The pressure-adjusting module controls the heat loss rate of the solar thermal collector by adjusting the air pressure inside the solar thermal collector and controlling the direction of air circulation to flow in or out of the solar thermal collector.

9 Claims, 5 Drawing Sheets

(51) Int. Cl.
*F24J 2/46* (2006.01)
*F24J 2/48* (2006.01)
*F24J 2/50* (2006.01)
*F24J 2/05* (2006.01)

(56) References Cited

U.S. PATENT DOCUMENTS

| | | | | |
|---|---|---|---|---|
| 4,437,456 A * | 3/1984 | Merrigan | ................... | F24J 2/30 126/637 |
| 5,531,215 A * | 7/1996 | Schwarz | ................ | F24J 2/0494 126/572 |
| 6,029,656 A * | 2/2000 | Schwarz | ................... | F24J 2/07 126/634 |
| 6,763,826 B1 * | 7/2004 | Gumm | ................... | F24J 2/085 126/599 |
| 7,077,124 B2 * | 7/2006 | Szymocha | ............ | F24J 2/0007 126/643 |
| 7,665,459 B2 * | 2/2010 | Lowstuter, Jr. | ......... | H02S 20/30 126/576 |
| 7,810,491 B2 * | 10/2010 | Benvenuti | ................. | F24J 2/05 126/653 |
| 8,307,820 B2 * | 11/2012 | King | ..................... | F24J 2/0015 126/571 |
| 8,528,542 B2 * | 9/2013 | Ustun | ..................... | F24J 2/055 126/652 |
| 8,985,097 B2 * | 3/2015 | Swift | ..................... | F24J 2/0444 126/635 |
| 9,200,821 B2 * | 12/2015 | Hammond | ............ | F24F 5/0014 |
| 9,557,077 B2 * | 1/2017 | Miles | ..................... | F24J 2/1047 |
| 2009/0139565 A1 * | 6/2009 | Jeronimo Lopes | .... | F24J 2/0427 136/251 |
| 2011/0180058 A1 * | 7/2011 | MacKay | ................ | F24J 2/0488 126/605 |
| 2013/0228166 A1 * | 9/2013 | Kuckelkorn | ............. | F24J 2/055 126/653 |
| 2015/0083114 A1 * | 3/2015 | Liu | ........................ | F24J 2/0483 126/652 |

FOREIGN PATENT DOCUMENTS

| | | |
|---|---|---|
| CN | 102052773 | 5/2011 |
| CN | 102401486 | 4/2012 |
| CN | 103225898 | 7/2013 |
| EP | 1916486 | 4/2008 |
| JP | S5774553 | 5/1982 |
| JP | S58198648 | 11/1983 |
| JP | S5960154 | 4/1984 |

OTHER PUBLICATIONS

"Office Action of China Counterpart Application", dated Jun. 30, 2016, p. 1-p. 7, in which the listed reference was cited.

* cited by examiner

SOLAR THERMAL COLLECTING SYSTEM

TECHNICAL FIELD

The invention relates to a thermal collecting system and particularly relates to a solar thermal collecting system utilizing a solar thermal collector.

BACKGROUND

Recently, industries related to the application of solar energy have been rapidly flourishing. The application of solar energy usually refers to transforming solar energy into electrical energy or thermal energy for use. Taking the transformation from solar energy to thermal energy as an example, solar thermal collectors are used to absorb solar radiation energy and transfer it into thermal energy. The thermal energy from sunlight is then utilized to heat water or other heat transfer materials for a variety of heating purposes.

At present, various types of solar thermal collectors are available, a part of which uses an absorbing plate to absorb the solar radiation energy, transfer it into thermal energy, and transmit the thermal energy to heat conducting tubes or evaporators, which are attached to the absorbing plate, so as to heat the heat transfer fluid (such as water, thermal oil, or other suitable liquids) within the heat conducting tubes or evaporators. Because the solar thermal collectors of this type are usually exposed to atmospheric pressure during operation, the high heat loss rate decreases the system efficiency and limits the operating temperature. Some other types of solar thermal collectors use a cylindrical absorber placed in a transparent cylindrical container. The cylindrical container encloses a vacuum space between the inner surface of cylindrical container and the outer surface of the cylindrical absorber. The cylindrical absorber absorbs the solar radiation energy so as to heat the heat transfer material within the cylindrical absorber. However, the solar thermal collectors of this type usually require use of glass material to transmit the thermal energy. Consequently, the poor heat conductivity of the glass material restricts the operating temperature and the system efficiency. In addition, some other types of solar thermal collectors allocate one or more absorbing plates in a sealed light-transmissive container. The container may be in a cylindrical or box shape and encloses a vacuum space inside for the absorbing plates to absorb the solar radiation energy in the vacuum state to minimize conduction and convection heat loss. Nevertheless, the solar thermal collectors of this type usually need to be fabricated by glass-metal sealing, which increases the production costs and has a high failure rate during the product life cycle. In addition, the permanently sealed collectors allow no air circulation to release excessive heat due to stagnation or excessive sunlight that may cause collector overheating or system damage.

SUMMARY

The invention provides a solar thermal collecting system for controlling the thermal collecting efficiency thereof.

The solar thermal collecting system of the invention includes at least a solar thermal collector and a pressure-adjusting module. The solar thermal collector includes a container, a light-transmissive cover, and a plurality of solar thermal collecting pipes. The container has an opening. The light-transmissive cover is placed on the opening to seal the container and sunlight is adapted to enter the container through the light transmissive cover. The solar thermal collecting pipes are allocated in the container for a heat transfer material to flow therein, and a solar selective coating is deposited correspondingly on the outer surface of each of the solar thermal collecting pipes. The solar selective coating absorbs the solar radiation energy, transforms it into thermal energy, and then transmits the thermal energy, through the wall of the solar thermal collecting pipes, to the heat transfer material flowing within the solar thermal collecting pipes. The pressure-adjusting modules are connected to the solar thermal collectors for controlling the air to flow into or out of the container in order to adjust the air pressure or to generate air circulation in the container.

Based on the above, because the path of transmitting the thermal energy from the outer pipe solar selective coating to the heat transfer material is short (only through the pipe wall of each solar thermal collecting pipe), the thermal efficiency can remain high. In addition, the pressure-adjusting module can adjust the air pressure or airflow directions in the solar thermal collectors, thereby reducing heat loss by reducing air pressure or increasing heat loss by increasing air pressure and air circulation in the solar thermal collectors. Furthermore, the solar thermal collector of this embodiment is provided with multiple solar thermal collecting pipes to collect solar energy simultaneously. Therefore, the solar thermal collecting system of this embodiment tends to produce thermal energy effectively.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention. The drawings illustrate exemplary embodiments of the invention and, together with the description, serve to explain the principles of the invention.

DESCRIPTION OF THE EMBODIMENTS

Figure 1:
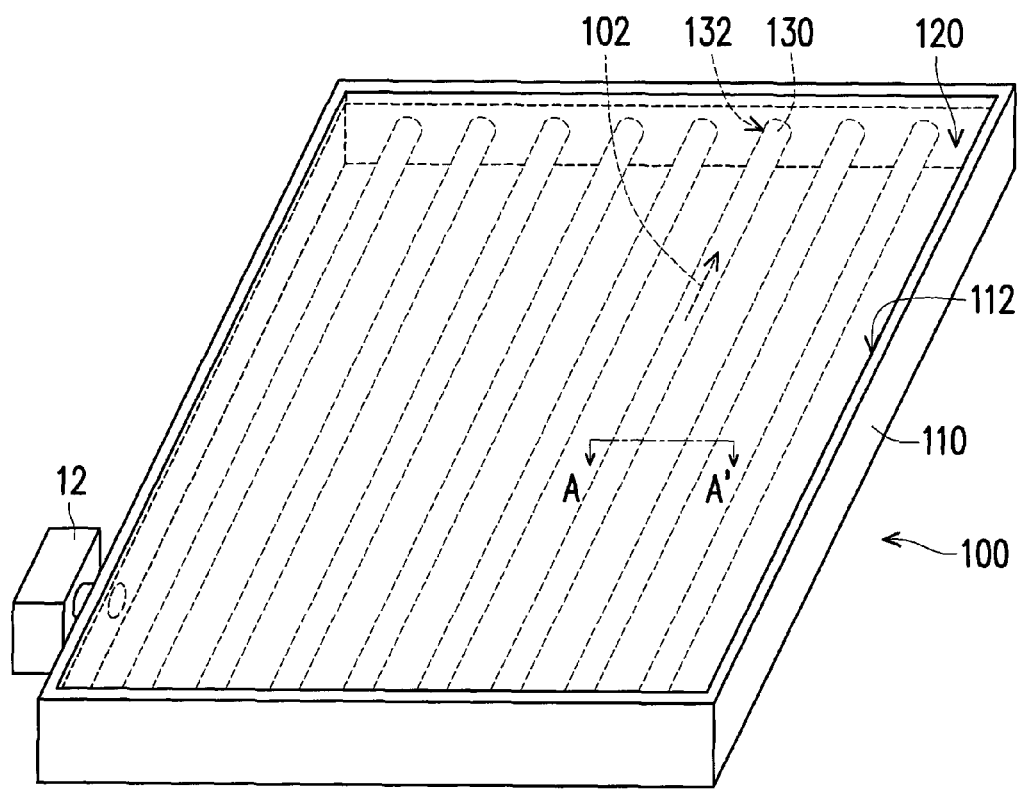
FIG. 1 is a schematic diagram of a solar thermal collecting system according to an embodiment of the invention.
Figure 2:
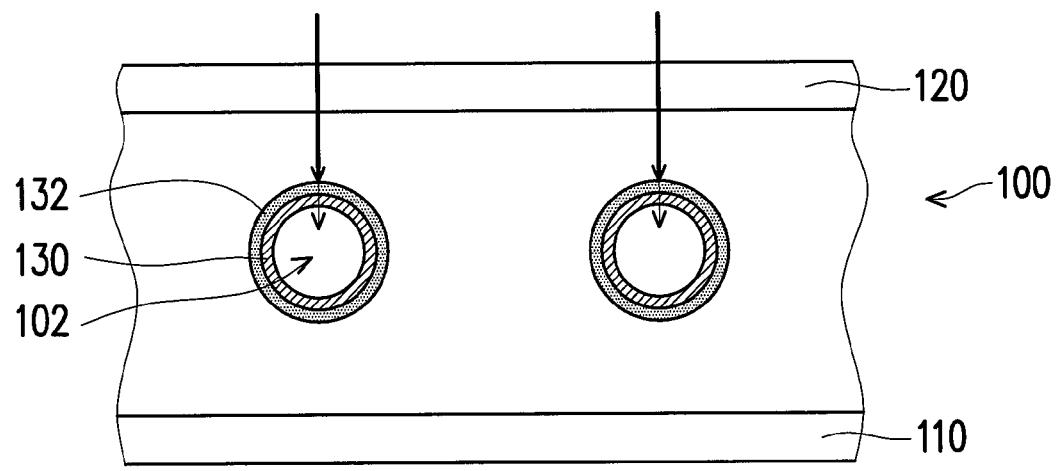
FIG. 2 is a cross-sectional diagram of a solar thermal collector of FIG. 1 along the line A-A'.

FIG. 1 is a schematic diagram of a solar thermal collecting system according to an embodiment of the invention. FIG. 2 is a cross-sectional diagram of a solar thermal collector of FIG. 1 along the line A-A'. With reference to FIG. 1 and FIG. 2, in this embodiment, a solar thermal collecting system 10 includes a solar thermal collector 100 and a pressure-adjusting module 12. The solar thermal collector 100 includes a container 110, a light-transmissive cover 120, and a plurality of solar thermal collecting pipes 130. The container 110 has an opening 112. The light-transmissive cover 120 is placed on the opening 112 to seal the container 110. In other words, the container 110 and the light-transmissive cover 120 form a sealed space. Sunlight is allowed to enter the container 110 through the light-transmissive cover 120. The solar thermal collecting pipes 130 are allocated in the container 110, within the sealed space formed by the container 110 and the light transmissive cover 120, to allow a heat transfer material 102 to flow therein. A solar selective coating 132 is correspondingly deposited on the outer surface of each of the solar thermal collecting pipes 130. In addition, the pressure-adjusting module 12 is connected to the container 110 of the solar thermal collector 100 for controlling the airflow into or out of the container 110 to adjust the air pressure or to generate air circulation in the container 110. For example, the air pressure in the container 110 can be adjusted to be higher than, equal to, or lower than atmospheric pressure or to be in a vacuum state. By doing so, it allows the solar thermal collector 100 to adjust the heat loss rate or thermal collecting efficiency through adjustment of the air pressure or airflow directions in the sealed space where the solar thermal collecting pipes 130 are allocated.

With reference to FIG. 2, in this embodiment, the solar selective coating 132 is applied for absorbing solar radiation energy and then transforming the radiation energy into thermal energy. In FIG. 2, bold arrows indicate the sunlight and thin arrows indicate the thermal energy. Accordingly, in this embodiment, the solar selective coating 132 is deposited on the outer surface of each solar thermal collecting pipe 130 to cover the solar thermal collecting pipes 130 respectively. The sunlight enters the container 110 through the light-transmissive cover 120 and the solar selective coating 132 absorbs the solar radiation energy. After absorbing the solar radiation energy that enters the container 110, the solar selective coating 132 transforms the radiation energy into the thermal energy and then transmits the thermal energy to the heat transfer material 102 flowing in the solar thermal collecting pipes 130. In this embodiment, the solar selective coating 132 is directly deposited on the outer surface of each solar thermal collecting pipe 130. Therefore, the thermal energy, which is obtained through absorption and transformation of the radiation energy by means of the solar selective coating 132, only needs to pass through the pipe wall of each solar thermal collecting pipe 130 to be transmitted to the heat transfer material 102 in the solar thermal collecting pipe 130. Based on the above, because the path of transmitting the thermal energy from the outer pipe solar selective coating 132 to the heat transfer material 102 is short (only through the pipe wall of each solar thermal collecting pipes 130), the thermal efficiency can remain high. In addition, the solar thermal collector 100 of this embodiment is provided with multiple solar thermal collecting pipes 130 to collect solar energy simultaneously. Therefore, the solar thermal collecting system 10 of this embodiment can produce thermal energy effectively.

Figure 3:
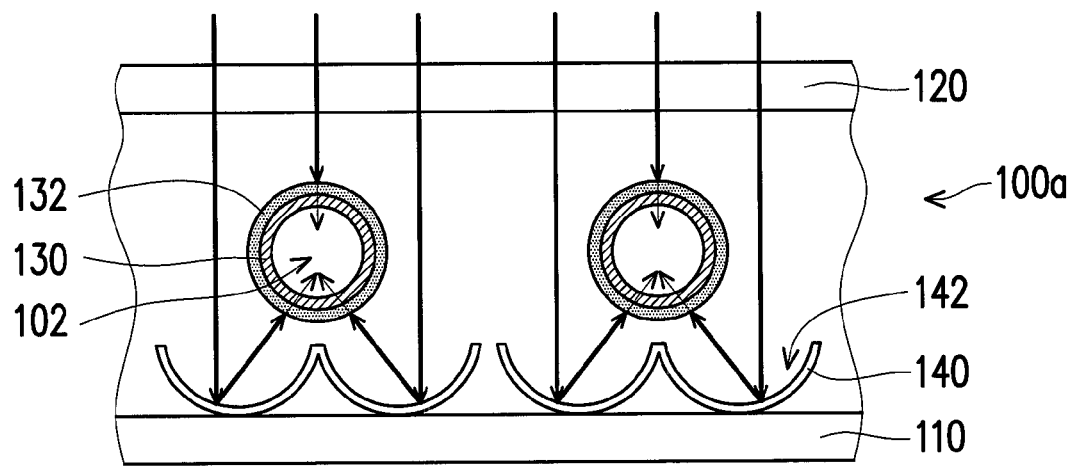
FIG. 3 is a cross-sectional diagram of a solar thermal collector according to another embodiment of the invention.

FIG. 3 is a cross-sectional diagram of a solar thermal collector according to another embodiment of the invention. With reference to FIG. 3, in this embodiment, a solar thermal collector 100a further includes a reflector 140. The reflector 140 includes a plurality of reflective planar surfaces (not shown) or reflective curved surfaces 142. The reflector 140 is placed in the container 110 with the reflective planar surfaces or reflective curved surfaces 142 facing the solar thermal collecting pipes 130. Moreover, the reflector 140 is placed at a side of the solar thermal collecting pipes 130 opposite to the light transmissive cover 120, e.g. at a bottom of the container 110. More specifically, the reflector 140 is a compound parabolic collector (CPC), for example, for reflecting and collecting light. Any two adjacent reflective curved surfaces 142 of the reflector 140 are connected with each other, and each of the solar thermal collecting pipes 130 is located above and between two adjacent reflective curved surfaces 142, so that the reflective curved surfaces 142 of the reflector 140 can reflect the light to the solar thermal collecting pipes 130 from multiple angles. Likewise, in FIG. 3, bold arrows indicate the sunlight and thin arrows indicate the thermal energy. A portion of the sunlight that enters the container 110 directly irradiates the solar thermal collecting pipes 130 from above, and the radiation energy thereof is transformed into thermal energy by the solar selective coatings 132 deposited on the upper sides of the solar thermal collecting pipes 130. Another portion of the sunlight is scattered in the container 110 that can be reflected to lower sides of the solar thermal collecting pipes 130 by the reflector 140, and the radiation energy thereof is transformed into thermal energy by the solar selective coatings 132 deposited on the lower sides of the solar thermal collecting pipes 130. Therefore, by placing the reflector 140 in the container 110 and applying the solar selective coatings 132 to the entire outer surfaces of the solar thermal collecting pipes 130, the thermal collecting pipes 130 can collect the solar radiation energy effectively to improve the heat collecting efficiency of the solar thermal collector 100a. Nevertheless, the disclosure here is not intended to limit the types of the solar thermal collector 100a and the reflector 140 of the invention. For instance, the solar thermal collector may be provided with a plate-shaped reflector or a reflector with one single curved surface that may be varied according to the requirements.

Figure 4:
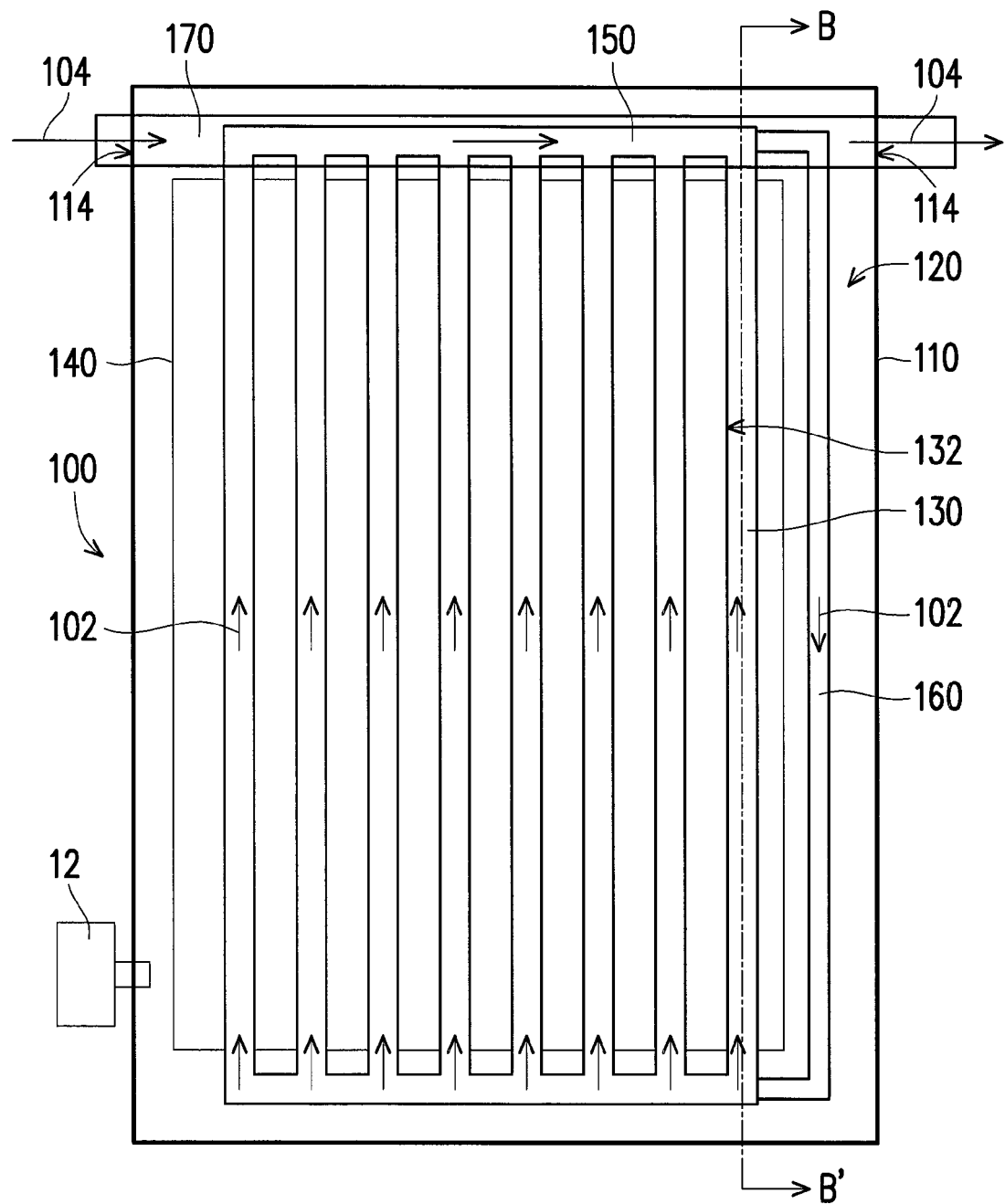
FIG. 4 is a schematic top view of the solar thermal collecting system of FIG. 1.
Figure 5:
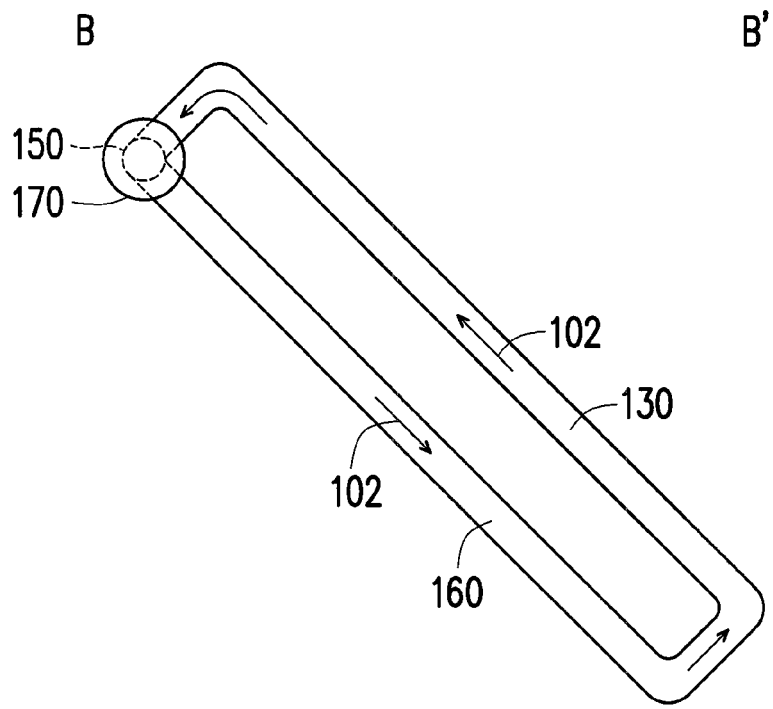
FIG. 5 is a cross-sectional diagram of a solar thermal collector of FIG. 4 along the line B-B'.

FIG. 4 is a schematic top view of the solar thermal collecting system of FIG. 1. FIG. 5 is a cross-sectional diagram of a solar thermal collector of FIG. 4 along the line B-B'. With reference to FIG. 4 and FIG. 5, in this embodiment, the solar thermal collector 100 further includes a heat-exchanging pipe 150 and a return pipe 160. The heat-exchanging pipe 150 is placed in the container 110 and is connected to solar thermal collecting pipes 130. The return pipe 160 is placed in the container 110 to connect with the heat exchanging pipe 150 and the solar thermal collecting pipes 130. In other words, the heat exchanging pipe 150, the return pipe 160, and the solar thermal collecting pipes 130 are connected so as to circulate the heat transfer material 102 through the heat exchanging pipe 150, the return pipe 160, and the solar thermal collecting pipes 130, wherein a flowing path of the heat transfer material 102 is indicated by the arrows in the heat exchanging pipe 150, the return pipe 160, and the solar thermal collecting pipes 130, as shown in FIG. 4. To be more specific, the heat transfer material 102 in the solar thermal collecting pipes 130 absorbs the thermal energy obtained through transformation of solar radiation energy (shown in FIG. 2) performed by the solar selective coatings 132. The heat transfer material 102 then flows to the heat exchanging pipe 150 and releases the thermal energy at the heat exchanging pipe 150. Thereafter, the heat transfer material 102 flows back to the solar thermal collecting pipes 130 via the return pipe 160 and again absorbs the thermal energy obtained through the solar thermal collecting pipes 130. Repeatedly, the thermal energy collected by the solar thermal collector 100 is continuously released via the heat-exchanging pipe 150.

Furthermore, in this embodiment, the solar thermal collector 100 further includes a cooling fluid pipe 170. The cooling fluid pipe 170 is placed at a side of the container 110. Two outlets 114 are also placed at the sides of the container 110. The two outlets 114 are formed on sidewalls of the container 110 and are opposite to each other. The cooling fluid pipe 170 is inserted into the container 110 through the outlets 114 and is located at the side of the container 110 in a manner that does not affect the airtightness of the container 110. The heat-exchanging pipe 150 is placed in the cooling fluid pipe 170 and connected with the solar thermal collecting pipes 130 and the return pipe 160. Meanwhile, a cooling fluid 104 flows into the cooling fluid pipe 170 to pass by the external side of the heat exchanging pipe 150 to exchange heat with the heat transfer material 102 in the heat exchanging pipe 150, wherein a flowing path of the cooling fluid 104 is indicated by the arrows in the cooling fluid pipe 170 as shown in FIG. 4. To be more specific, the heat-exchanging pipe 150 of this embodiment can also serve as a condenser. Therefore, after the heat transfer material 102 absorbs the thermal energy in the solar thermal collecting pipes 130 and flows into the heat exchanging pipe 150, the thermal energy is released in the condenser by phase-changing mechanism. The cooling fluid 104 that flows into the cooling fluid pipe 170 and passes by the external side of the heat exchanging pipe 150 absorbs the thermal energy released by the heat transfer material 102 and flows out of the cooling fluid pipe 170. Accordingly, by placing the heat-exchanging pipe 150 and condenser in the cooling fluid pipe 170, the thermal energy is transferred between the heat transfer material 102 and the cooling fluid 104. Thereafter, the heat transfer material 102 that has released the thermal energy in the heat exchanging pipe 150 flows back to the solar thermal collecting pipes 130 via the return pipe 160 and then absorbs thermal energy again. Repetitively, the thermal energy collected by the solar thermal collector 100 is transferred and carried away by the cooling fluid 104.

Additionally, in this embodiment, the cooling fluid 104 may be pressurized water or saturated steam, with a temperature ranging from 30° C. to 180° C., in the cooling fluid pipe 170. A phase change material that transforms between liquid and vapor (such as water, methanol, or ammonia) may be used as the heat transfer material 102. Therefore, in this embodiment, the height of the heat exchanging pipe 150, relative to a horizontal plane (e.g. the ground), is less than the height of top end of the solar thermal collecting pipe 130 (as illustrated in FIG. 5, where the arrows in FIG. 5 indicate a flowing path of the heat transfer material 102). For instance, after absorbing the thermal energy in the solar thermal collecting pipes 130, the heat transfer material 102 may become vapor, rise to the top end, and then flow into the heat exchanging pipe 150. After the heat transfer material 102 performs heat exchange with the cooling fluid 104 in the cooling fluid pipe 170 through condenser in the heat exchanging pipe 150, the heat transfer material 102 releases the thermal energy, transforms back to liquid form, and flows back to the solar thermal collecting pipe 130 via the return pipe 160 in liquid form. As described above, by placing the top of the solar thermal collecting pipe 130, which transmits the vaporized heat transfer material 102, higher than and the top of return pipe 160, which transmits the liquid heat transfer material 102, this may prevent the mixture of the heat transfer material 102 in different phases (vapor and liquid). However, in other embodiments, a single-phase material, such as glycol water or thermal oil, may also be used as the heat transfer material 102. The disclosure here is not intended to limit the type of the heat transfer material 102 used in the invention. When the single-phase heat transfer material 102 is used during the heat transfer process, the solar thermal collecting pipe 130, the heat exchanging pipe 150, and the return pipe 160 do not need to be placed at different heights relative to the horizontal plane.

Figure 6:
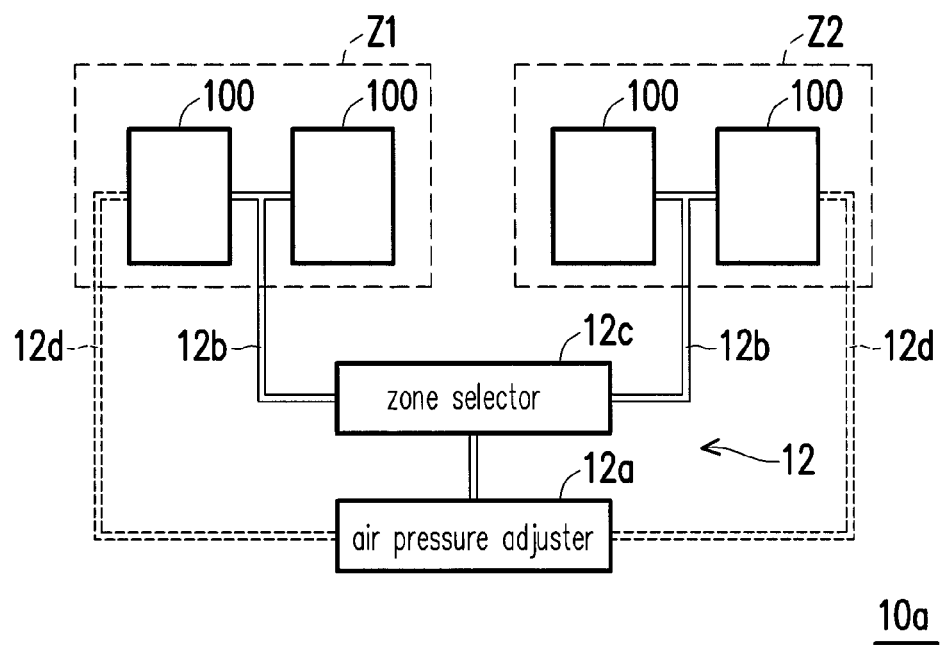
FIG. 6 is a schematic diagram of a solar thermal collecting system according to another embodiment of the invention.

FIG. 6 is a schematic diagram of a solar thermal collecting system according to another embodiment of the invention. With reference to FIG. 1 and FIG. 6, although both the solar thermal collecting system 10a of this embodiment and the solar thermal collecting system 10 both utilize the solar thermal collector 100, a key difference is that the solar thermal collecting system 10a uses more than one solar thermal collector 100. In this embodiment, four solar thermal collectors 100 are illustrated as an example.

However, this example is not intended to limit the number of the solar thermal collectors 100 of the invention. The solar thermal collectors 100 are connected in series or in parallel with each other. Moreover, the solar thermal collectors 100 are respectively located in a plurality of zones, such as zones Z1 and Z2 shown in FIG. 6. In addition, the pressure-adjusting module 12 of this embodiment includes an air pressure adjuster 12a, at least one air pipe 12b, and a zone selector 12c. The air pressure adjuster 12a is connected to the containers 110 (depicted in FIG. 1) of the solar thermal collectors 100 via the at least one air pipe 12b, so as to adjust air pressure or airflow directions in the containers 110 as required. For example, the air pressures in the containers 110 are adjusted to be higher than, equal to, or lower than an atmospheric pressure or to be in a vacuum state. The air pressure adjuster 12a may be a pump, for example. In addition, the air pressure adjuster 12a may also control the airflow directions or generate air circulation in and out of the container 110 through the air pipes 12b. Accordingly, the solar thermal collecting system 10a of this embodiment is capable of controlling the heat loss rate of the solar thermal collector 100. Able to control the heat loss rate of the solar thermal collector is advantageous in various aspects. For example, by adjusting the air pressure in the container 110 to a low pressure (e.g. a pressure value between 10 torr and $5\times10^{-3}$ torr) or a vacuum state, the heat loss rate of the solar thermal collector 100 is reduced. Therefore, in comparison with the state of the atmospheric pressure (e.g. the pressure value is between 760 torr and 450 torr), the solar thermal collector 100 in the state of low pressure or in the vacuum state has high heat collecting efficiency and is operable at a high temperature. In other embodiments, the air pressure in the container 110 may be increased to the atmospheric pressure (e.g. the pressure value is between 760 torr and 450 torr) or to be higher than the atmospheric pressure to generate air circulation in the container 110, so as to increase the heat loss rate and prevent the solar thermal collecting pipes 130 from being overheated.

In addition, the containers 110 of the solar thermal collectors 100 in the same zone (e.g. Z1 or Z2) are connected to communicate with each other via a plurality of corresponding air pipes 12b. The zone selector 12c communicates with the air pressure adjuster 12a and the air pipes 12b correspondingly to the zones Z1 and Z2 in order to adjust the air pressures in the containers 110 of the solar thermal collectors 100 in different zones Z1 and Z2. Therefore, the air pressure adjuster 12a may keep the air pressures of the solar thermal collectors 100 the same in the same zone (e.g. Z1 or Z2). On the other hand, different adjustments may be applied to the solar thermal collectors 100 in different zones. For example, the solar thermal collectors 100 in the zone Z1 are adjusted to the vacuum state while the solar thermal collectors 100 in the zone Z2 are adjusted to the atmospheric pressure state. Furthermore, the air pressure adjuster 12a may connect with the solar thermal collectors 100 via additional air pipes 12d, so as to dissipate heat of the solar thermal collectors 100 in the zones Z1 or Z2 by conducting air circulation. Nevertheless, in other embodiments, the zone selector 12c and the air pipe 12d of the pressure-adjusting module 12 may be omitted. In another embodiment the air pressure of each solar thermal collector 100 may be independently adjusted by the air pressure adjuster 12a and the air pipe 12b (that is, only one solar thermal collector 100 is disposed in each zone). It is noted that the invention is not limited to the aforementioned.

Figure 7:
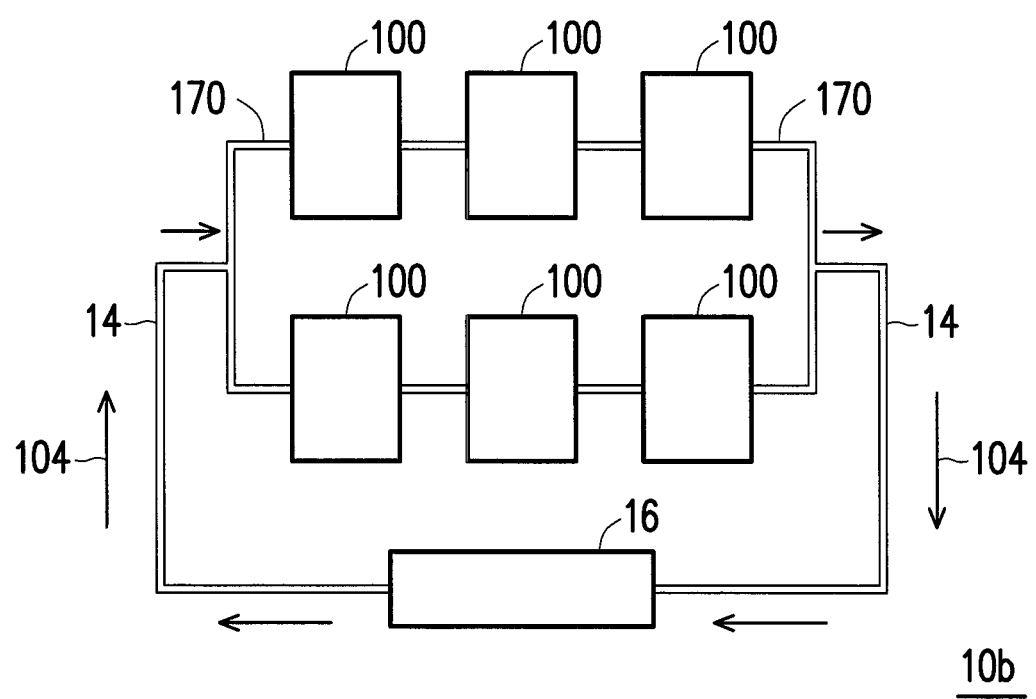
FIG. 7 is a schematic diagram of a solar thermal collecting system according to yet another embodiment of the invention.

FIG. 7 is a schematic diagram of a solar thermal collecting system according to yet another embodiment of the invention. With reference to FIG. 1, FIG. 4, and FIG. 7, although the solar thermal collecting system 10b of this embodiment and the solar thermal collecting system 10 both utilize the solar thermal collector 100, a key difference is that the solar thermal collecting system 10b uses more than one solar thermal collector 100. In this embodiment, six solar thermal collectors 100 are illustrated as an example. However, it is noted that this example is not intended to limit the number of the solar thermal collectors 100 of the invention. Two sets of three solar thermal collectors 100 are connected in parallel via cooling fluid pipes 170. In other words, the six solar thermal collectors 100 of this embodiment are arranged in an array of 2×3, wherein the solar thermal collectors 100 in the same row are connected in series, and the solar thermal collectors connected in series are connected in parallel to each other. The aforementioned solar thermal collectors 100 are connected in series or in parallel to communicate with each other via the cooling fluid pipes 170. The number and connection methods of the solar thermal collectors 100 in the solar thermal collecting system may be varied as required to adjust an operating temperature range of the solar thermal collecting system.

Moreover, with reference to FIG. 1, FIG. 4, and FIG. 7, in this embodiment, the solar thermal collecting system 10b further includes a connection pipe 14 and a heat exchanger 16. The heat exchanger 16 is connected with the cooling fluid pipe 170 via the connection pipe 14, such that the cooling fluid 104 that flows through the cooling fluid pipe 170 flows into the heat exchanger 16 to perform heat exchange, as indicated by the arrows in FIG. 7. To be more specific, the solar thermal collectors 100 transform the solar radiation energy to thermal energy by the solar selective coatings 132 deposited on the solar thermal collecting pipes 130 and then transmit the thermal energy to the cooling fluid 104 through the heat transfer material 102 (details are given above). Therefore, the cooling fluid 104 flows into the solar thermal collectors 100 that are arranged in the array via the cooling fluid pipe 170 and receives the thermal energy. Then the cooling fluid 104 may further flow to the heat exchanger 16, via the connection pipes 14, to transmit the thermal energy to the heat exchanger 16, or in other words, the cooling fluid 104 releases the thermal energy in the heat exchanger 16. Thereafter, the cooling fluid 104 flows into the solar thermal collectors 100 again through the cooling fluid pipe 170 via the connection pipe 14 to receive the thermal energy transmitted by the heat transfer material 102. The heat exchanger 16 stores the thermal energy received from the cooling fluid 104 or directly applies the thermal energy elsewhere, e.g. for heating substances as required. Accordingly, the solar thermal collecting system 10b repeatedly collects thermal energy from the solar thermal collectors 100 and releases the thermal energy via the heat exchanger 16. Likewise, in the solar thermal collecting system 10 which is provided with only one solar thermal collector 100, the thermal energy transmitted from the heat transfer material 102 to the cooling fluid 104 may also be released via a heat exchanger. Therefore, the aforementioned method for extracting the collected thermal energy is applicable to a solar thermal collecting system that has single or multiple solar thermal collectors.

To summarize, in the solar thermal collecting system of the invention, a plurality of solar thermal collecting pipes are allocated in the container of the solar thermal collector, wherein the solar selective coatings are deposited correspondingly on the outer surfaces of the solar thermal collecting pipes, and the heat transfer material may flow in the solar thermal collecting pipes. After absorbing the solar radiation energy, the solar selective coatings transform the irradiation energy into thermal energy and then transmit the thermal energy to the heat transfer material flowing within the solar thermal collecting pipes through pipe walls of the solar thermal collecting pipes. Because the path for transmitting the thermal energy from solar selective coating to the heat transfer material is short, the thermal efficiency is improved. Additionally, the pressure-adjusting module adjusts the air pressure or airflow directions in the solar thermal collectors, thereby can control the heat loss rate of the solar thermal collectors. Moreover, the solar thermal collector has multiple solar thermal collecting pipes for collecting heat simultaneously. Thus, the solar thermal collecting system of the invention can collect thermal energy effectively. Further, the solar thermal collecting system of the invention may also be provided with a plurality of solar thermal collectors and release the thermal energy collected by the solar thermal collectors through heat exchange between the cooling fluid and the heat transfer material.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:
1. A solar thermal collecting system, comprising:
at least one solar thermal collector, comprising:
a container having an opening;
a light-transmissive cover placed on the opening to seal the container; and
a plurality of solar thermal collecting pipes allocated in the container for a heat transfer material to flow therein, and a solar selective coating being disposed correspondingly on an outer surface of each of the solar thermal collecting pipes, wherein sunlight is adapted to enter the container through the light-transmissive cover, and the solar selective coating is for absorbing solar radiation energy, transforming the radiation energy into thermal energy, and transmitting the thermal energy to the heat transfer material flowing in the solar thermal collecting pipes;
a heat exchanging pipe placed in the container and connected to the solar thermal collecting pipes;
and a return pipe placed in the container and connected to the heat exchanging pipe and to the solar thermal collecting pipes, wherein the heat transfer material absorbs the thermal energy from the sunlight, flows into the heat exchanging pipe, and then flows back to the solar thermal collecting pipes via the return pipe after releasing the thermal energy in the heat exchanging pipe; and a cooling fluid passing by an external side of the heat exchanging pipe to exchange heat with the heat transfer material in the heat exchanging pipe; and a pressure-adjusting module, connected to the container of at least one solar thermal collector, controlling a direction of airflow into or out of the container, adjusting an air pressure between 0.005 and 760 Torr, or adjusting an air circulation in the container.

2. The solar thermal collecting system according to claim 1, wherein the solar thermal collector further comprises: a reflector placed in the container to face the solar thermal collecting pipes, wherein the reflector is allocated at a side of the solar thermal collecting pipes opposite to the light-transmissive cover, and a portion of the sunlight that enters the container is reflected to the solar thermal collecting pipes by the reflector.

3. The solar thermal collecting system according to claim 2, wherein the reflector comprises a plurality of reflective planar surfaces or reflective curved surfaces facing the solar thermal collecting pipes.

4. The solar thermal collecting system according to claim 1, wherein a height of the heat exchanging pipe relative to a horizontal plane is less than a height of a top end of the solar thermal collecting pipes relative to the horizontal plane.

5. The solar thermal collecting system according to claim 1, wherein the solar thermal collector further comprises: a cooling fluid pipe placed at a side of the container, and the heat exchanging pipe being located in the cooling fluid pipe, wherein the cooling fluid flows into the cooling fluid pipe and passes by the external side of the heat exchanging pipe.

6. The solar thermal collecting system according to claim 5, comprising a plurality of the solar thermal collectors, wherein the cooling fluid pipes of the solar thermal collectors are connected in series or in parallel with each other.

7. The solar thermal collecting system according to claim 6, further comprising: a heat exchanger connected to the cooling fluid pipes that allows the cooling fluid flowing through the cooling fluid pipes to release heat in the heat exchanger.

8. The solar thermal collecting system according to claim 1, wherein the pressure-adjusting module comprises an air pressure adjuster and at least one air pipe, wherein the air pressure adjuster is connected to the container via the air pipe to adjust the air pressure in the container, or control the direction of the airflow into or out of the container via the air pipe.

9. The solar thermal collecting system according to claim 8, comprising a plurality of the solar thermal collectors, wherein the pressure-adjusting module further comprises a zone selector; the solar thermal collectors are respectively located in a plurality of zones, and the containers of the solar thermal collectors in the same zone are connected with each other via a plurality of corresponding air pipes; and the zone selector communicates with the air pressure adjuster to select the air pipes corresponding to the zones that allow the air pressure adjuster to adjust the air pressure and airflow directions in the containers of the solar thermal collectors in different zones.

* * * * *